United States Patent [19]

Maass et al.

[11] 4,112,598
[45] Sep. 12, 1978

[54] SHELF MANAGEMENT DEVICE

[75] Inventors: Edward A. Maass, Minneapolis, Minn.; William A. Stoneberg, Naperville, Ill.

[73] Assignee: Magnecorp, Inc., Oak Brook, Ill.

[21] Appl. No.: 794,978

[22] Filed: May 9, 1977

[51] Int. Cl.² ............................................. G09B 1/08
[52] U.S. Cl. ........................................... 35/53; 35/7 A
[58] Field of Search .................. 35/7 A, 53, 60; 281/33

[56] References Cited
U.S. PATENT DOCUMENTS

| 2,254,810 | 9/1941 | Will | 35/7 A |
| 3,080,664 | 3/1963 | Bland | 35/7 A X |
| 3,199,897 | 8/1965 | Wolfe | 281/33 |
| 3,629,960 | 12/1971 | Roush | 35/60 |
| 3,797,135 | 3/1974 | Linker | 35/53 |

FOREIGN PATENT DOCUMENTS 842,480  7/1960  United Kingdom ................. 35/7 A Primary Examiner—Harland S. Skogquist

[57] ABSTRACT

A board and plaques detachably securable thereto. The plaques are miniaturized versions of packaged merchandise as viewed from the front. The board is imprinted with two-dimensional miniaturized representations of shelves and/or partitions marking off shelf sections. The plaques are temporarily positioned on the board in a selected layout in simulation of full sized displays of the merchandise in order to facilitate stocking the shelves and/or re-arranging the shelves and/or vertical partitions. The board includes a laminar ferromagnetic panel and the plaques include magnets. Alternatively, a disruptible adhesive may be used to attach the plaques to the panel.

1 Claim, 9 Drawing Figures

U.S. Patent  Sept. 12, 1978  Sheet 2 of 2  4,112,598
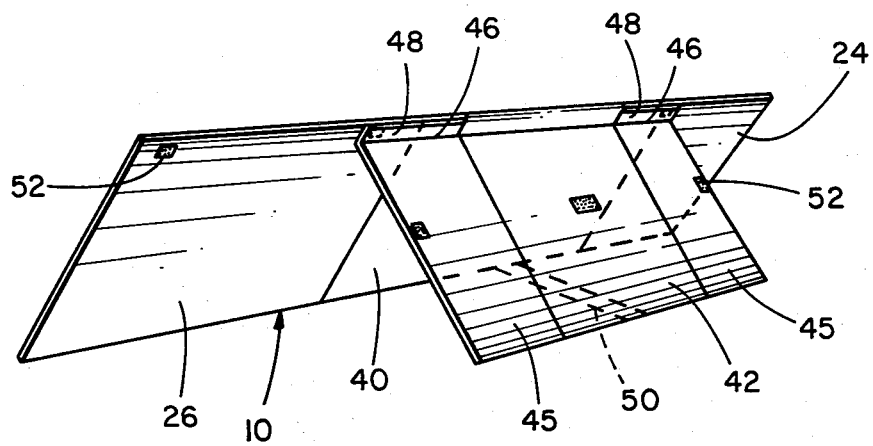
FIG.5
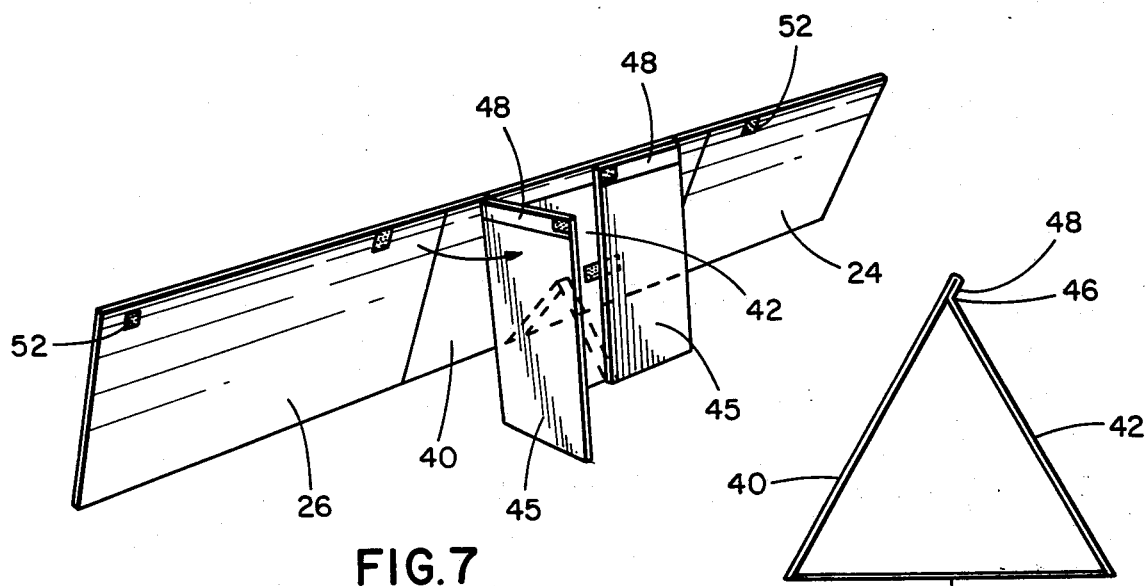
FIG.7
FIG.6
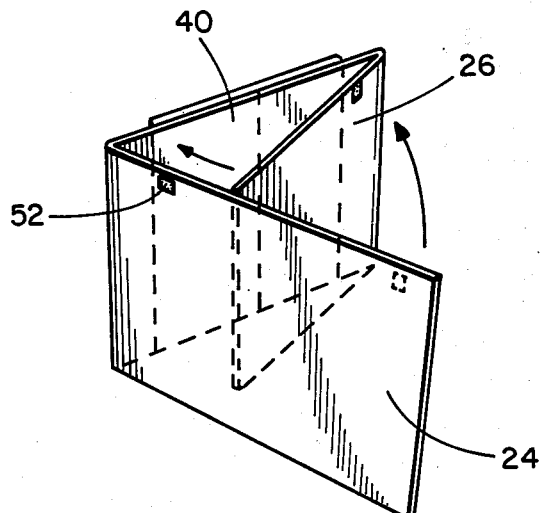
FIG.8
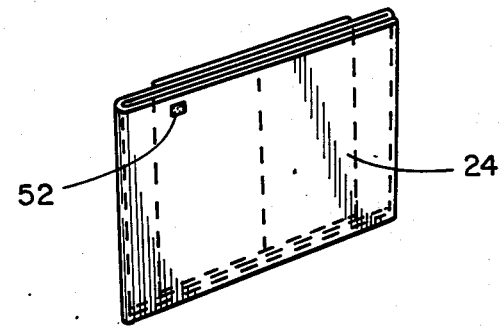
FIG.9

SHELF MANAGEMENT DEVICE

BACKGROUND OF THE INVENTION

In the mass-merchandising of consumer goods, e.g. groceries in super markets, intense competition between manufacturers necessitates very close collaboration between the manufacturer or wholesaler and retailer since, obviously, the manufacturer who is able to display his goods to maximum advantage is favored in the marketplace. For example, upper shelves more directly in the shopper's normal line of vision are preferred over those which are lower. The retailer carries many well-advertised items of similar nature, e.g. cereals and, being limited in shelf-space, is obliged to allocate limited display space to each different brand. It then becomes a contest between wholesalers and/or manufacturers to utilize the space allocated to him to maximum advantage, having in mind the rank each item will occupy. For example, if Kellogg's Corn Flakes outsells Post's Raisin Bran 10 to 1, then Kellogg's representative will see to it that his display is so arranged as to maintain that advantage, i.e. he will allocate proportionately greater space to his corn flakes and similarly with regard to other cereals in his line. Having decided on an optimum use of the space allocated to him in terms of shelf space, the manufacturer or his wholesaler will then make his plan known to the retailer. Obviously collaboration will be in order. A large supermarket chain can easily number several hundred stores nationwide.

To effectuate a plan conceived as aforesaid, the same is communicated to the retailer as a recommended plan to be followed if maximum profit is to be derived. Obviously, the alternative would be to have the storekeeper make his own arrangement, in which case indiscriminate allocation of items and shelf-arrangement will lead to purchaser confusion, out of stock condition, and lower sales of the items not subjected to a planned display. By concentrating the planning of displays in the hands of experts in selling psychology substantially greater advantages will accrue to the dealer following such expert advice. Once the layout of a particular display has been finalized it may be placed in the hands of the retailer as a model to be followed in the full-sized arrangement in the store or, if desired, photographed and prints distributed. Moreover, the miniaturized display should be sufficiently flexible to enable repeated use when a change in display is to be executed.

SUMMARY OF THE INVENTION

The invention comprises a display panel of some wieldable mass including an easel, in order that the operator may set the same in a comfortable position say, on a desk, while planning and arranging the plurality of detachably-securable plaques. The plaques are desirably to some convenient scale, say 1:10 in order that the apparatus may be portable and set up conveniently. The display panel of the apparatus may be constituted as one central panel together with side panels hinged to the center panel and foldable within the boundary of the center panel. Conveniently the several panels may be mutually secured by means of Velcro pads or other disconnectible fasteners.

The display panel, or panels, are imprinted with a plurality of horizontal lines, a selected pair or pairs of which will indicate the possible location or locations of a shelf or shelves. In laying out the disposition of the goods, a shelf will be represented by an elongated plaque of the same construction as the merchandise plaques.

The spacing between shelves will be such as to accommodate the plaques representing the actual goods. Thus, when a row of plaques is located on a simulated shelf, the next shelf above it will have some clearance with respect to the height of a package plaque. Similar considerations will obtain concerning the widthwise clearance between groups of different items and between an item and a vertical partition, if any, which not only subdivides the shelves into horizontal sections but may act as physical support therefor. The strips which are used to simulate shelves may also be employed in the vertical sense to represent vertical sub-dividers.

Each different kind of package is represented by attaching to the board a plaque which is a scaled-down version of the article which it represents, including printed and pictorial matter in the colors of its full-sized counterpart. Thus, when the miniaturized version of a display is located on the background, the overall effect of the entire display as it would appear in the retail store may be studied for maximum sales impact, and any alterations in the layout readily made on the model.

DESCRIPTION OF THE DRAWINGS

FIG. 5 is a perspective view of the apparatus from the rear;

FIG. 6 is a side view in the direction of the arrows 6—6 of FIG. 1;

FIG. 7 is similar to FIG. 5 but with the assembly partially collapsed prior to storage;

FIG. 8 is similar to FIG. 7 but with the assembly in a subsequent state of collapse; and FIG. 9 shows the assembly fully collapsed into flat condition.

DESCRIPTION OF THE PREFERRED EMBODIMENT

Figure 1:
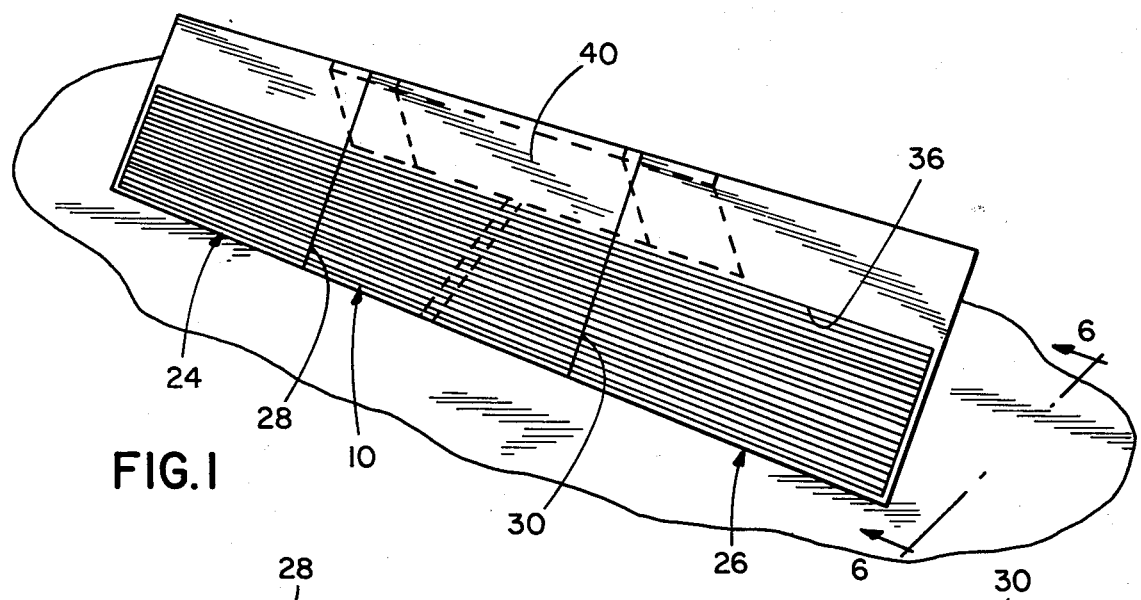
FIG. 1 is a perspective of one form of the apparatus opened for use.

Reverting now to the drawings, there is shown a rigid, composite board 10 comprising, in order, a sheet 12 (FIG. 4) of a vinyl plastic, a sheet 14 of ferromagnetic material, e.g. sheet iron, a filler sheet 16 of chipboard and another sheet 18 of vinyl plastic. The two sheets of vinyl are desirably heat-welded along their common periphery to contain the layers 12 and 14. Vinyl plastic is preferred for the layers 12 and 14 since it receives printing well and may be obtained with a non-glare or matte finish to favor the user's eyes.

Figure 4:
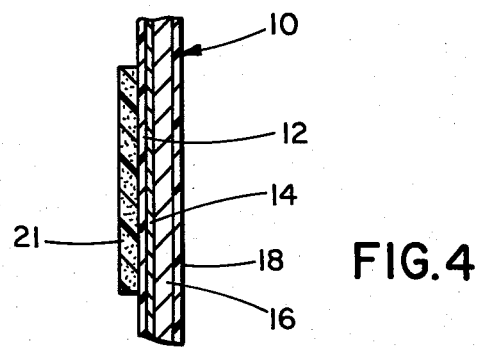
FIG. 4 is a cross section taken on the line 4—4 of FIG. 2.

The cross section of FIG. 4 includes one of the detachably secured plaques 21, formed of a plastics composition, e.g. vinyl, in which are embedded magnetized particles in order that the plaques will be held on the panel, but not so firmly that they may not be readily removed or shifed by sliding. Reference is made to a brochure entitled "Koroseal Flexible Magnets" published by B. F. Goodrich General Products Co., Akron, Ohio, for particulars of vinyl sheet having magnetic particles incorporated therein.

Figure 3:
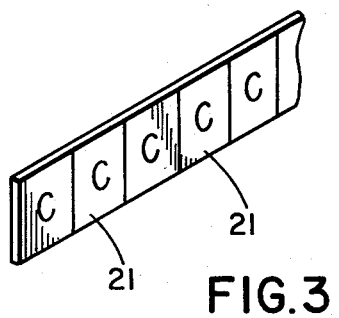
FIG. 3 is a fragment, in perspective, of package plaques made in multiple.

The plaques may be made available singly or in multiple (FIG. 3) and, since the plastics material is not too dense or rigid, these may be cut with a scissors to yield sub-multiple or single pieces, or may be partially die-cut for easy separation. To simplify the drawing a few different sizes of plaques are indicated by the letters A to E, it being understood from what has preceded, that the front face of the plaques will bear miniature illustrations of the front face of the commercial package.

A typical method of producing the plaques is as follows:

a. Facings, i.e. reproductions of merchandise are printed on a paper/plastic material (Kimdura) by a color printing process;
b. The printed sheets are laminated to B. F. Goodrich Koroseal material impregnated with magnetic particles, by using a permanent adhesive;
c. Finished laminated sheets are die cut into the desired shapes and sizes of individual plaques,
d. Finished plaques are kept in reserve on a separate magnetized board until required for use on the display board.

Alternatively, the plaques may have a layer of pressure-sensitive adhesive applied to the rear surface thereof, in lieu of the magnetic mode of attachment. By their use a semi-permanent display board on a cardboard back will provide a permanent and reproducible replica of the finished merchandise arrangement.

Figure 2:
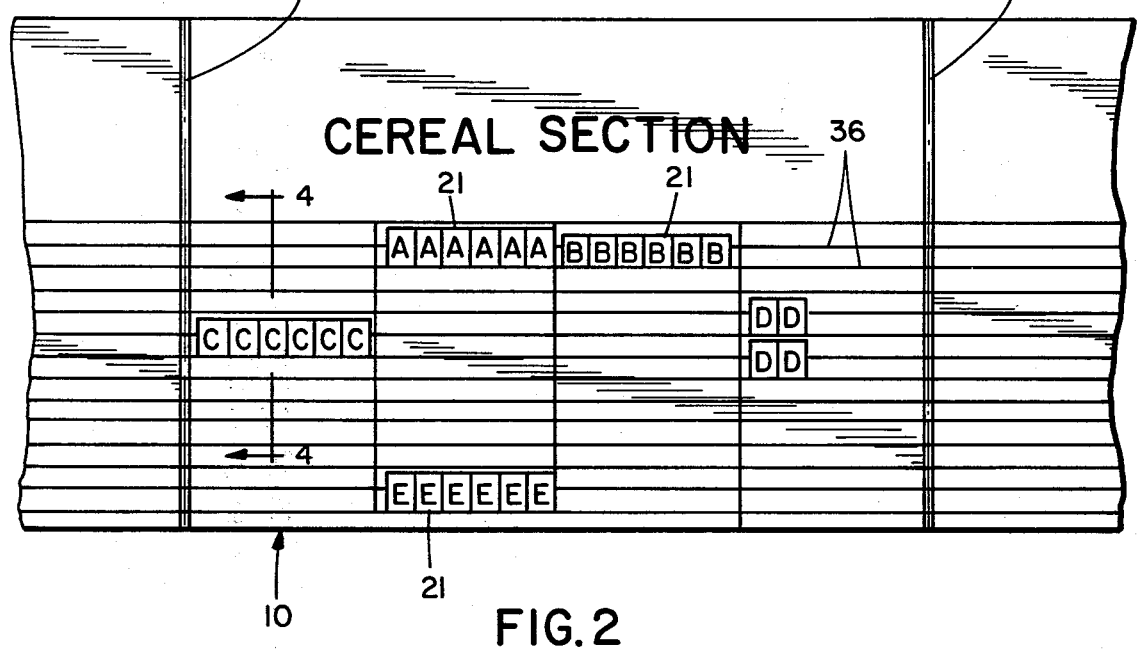
FIG. 2 is a front elevation of a portion of the apparatus including partial displays assembled thereon.

The exemplificative arrangement of plaques shown in FIG. 2 shows scattered groups of plaques. However, in practice, almost the entire available area will be covered in the same way as the display of commercial packages in the retail store.

The right and left wings 24 and 26 are hinged to the center panel along the lines 28 and 30. In this way, a somewhat extended unit may be realized. By the same token, one or both of the wings 24 and 26 may be omitted. Hinged connection of one panel to another may be readily achieved by continuing the vinyl sheets across the panels, in which case the inherent flexibility of the vinyl sheets provides the fold lines.

The central panel and any wings are imprinted with a plurality of parallel lines 36, say 1/10 inch apart, to aid in locating strips of the same material as the plaques to designate the shelves of the actual in-store display. These strips are indicated by single lines in the drawings for simplicity.

The panel or panels 24–26 will be supported on a desk or may be suspended on a wall. In the case of a desk, the apparatus will be disposed at a convenient viewing angle (FIG. 6). Since plaques 21 and shelves 36 are retained magnetically in their adjusted positions, and the weight thereof is inconsequential, gravity will be ineffective to disturb their arrangement.

A preferred form of easel is illustrated in FIGS. 5 to 9, in which two side wings 24–26 are disposed as shown, one at either side of the center panel 40 and hinged thereto as hereinbefore described.

Support is provided for the entire apparatus by means of struts 45—45 hinged at 46—46 by means of marginal tabs 48—48 secured to the rear face of the panel 40. The struts 45—45 are constituted as lateral extensions of the flap 42. A strip 50 of flexible material secured by its ends to the rear of the panel 40 and to the panel 42 serves to limit the degree of opening of the easel, as will be understood.

The drawing is believed to adequately depict the several aspects of the device beginning with fully closed position (FIG. 9) to fully open position (FIGS. 1 and 5).

Desirably, means are provided for maintaining the several panels in compact form pending use. For example, Velcro pads, such as 52, indicated diagrammatically as stippled rectangles.

We claim:

1. In combination with a shelf management device of the class which comprises a rigid primary panel (40) carrying a pair of rigid secondary panels, (24–26) each hinged to the primary panel at an upright edge thereof, each of said panels having a layer of ferromagnetic material coextensive with the surface of the panel and a plurality of magnetized plaques (21) adapted for detachable securement to the front side of the panels in selected arrangements, means for supporting the device with said panels co-planar and inclined to an ultimate supporting surface, said means comprising a central flap (42) mounted on the rear face of the primary panel on a horizontal axis and adapted to be swung outwardly to define an acute angle between the primary panel (40) and central flap (42), an element (50) extending between said rear face and flap to limit rotation of the flap, said flap having two parallel lateral edges, a pair of second flaps (45—45) each having one edge hingedly connected to a respective said upright edge of the central flap to be folded and unfolded into flat relation with the central flap, said second flaps (45—45), when folded, together having no greater widthwise extent than the widthwise extent of the central flap so that, when folded, the second flaps (45—45) will lie flat against the central flap, each of said second flaps (45—45) being hinged at the top to the top of the central flap (42) to enable a collapsed assembly no greater in thickness at its thickest part than the combined thickness of a second flap (45), the central flap (42) and the primary panel (40).

* * * * *